United States Patent [19]

Blaho et al.

[11] Patent Number: 5,896,141

[45] Date of Patent: Apr. 20, 1999

[54] SYSTEM AND METHOD FOR VIRTUAL DEVICE ACCESS IN A COMPUTER SYSTEM

[75] Inventors: Bruce Blaho; Courtney Goeltzenleuchter; Russ W. Herrell, all of Fort Collins, Colo.

[73] Assignee: Hewlett-Packard Company, Palo Alto, Calif.

[21] Appl. No.: 08/774,452

[22] Filed: Dec. 30, 1996

Related U.S. Application Data

[63] Continuation of application No. 08/690,424, Jul. 26, 1996, abandoned.

[51] Int. Cl.$^6$ .................................................. G06F 15/167
[52] U.S. Cl. ........................ 345/512; 345/501; 345/520; 395/673; 395/678
[58] Field of Search .................................. 345/501, 502, 345/507, 512, 520; 395/569, 670, 672, 673, 677, 678, 733, 735, 737, 740–742

[56] References Cited

U.S. PATENT DOCUMENTS

| | | | |
|---|---|---|---|
| 5,224,210 | 6/1993 | Pinedo et al. | 345/501 |
| 5,371,849 | 12/1994 | Peaslee et al. | 345/501 |
| 5,430,841 | 7/1995 | Tannenbaum et al. | 345/502 |
| 5,469,571 | 11/1995 | Bunnell | 395/673 |

*Primary Examiner*—Kee M. Tung

[57] ABSTRACT

A system and method for virtual device access in a graphics computer is disclosed. The present invention enables applications running on a graphics computer to access the graphics hardware device with no per-transaction performance cost. Each time an application attempts to access the graphics hardware device, a hardware control manager either gives the application access to the graphics hardware device if no other application is currently accessing the hardware, or alternatively, if another application is currently accessing hardware, the hardware control manager instructs a signal handler associated with the application attempting access to perform a graphics context switch with the currently accessing application before the hardware control manager will give permission to the application attempting access to access the graphics hardware device. An important feature of the present invention is that the device dependent features are provided by user level code via the signal handler whereas the hardware control manager supports only device independent features. Another important feature of the present invention is the ability to automatically control data flow without incurring additional overhead.

19 Claims, 4 Drawing Sheets

SYSTEM AND METHOD FOR VIRTUAL DEVICE ACCESS IN A COMPUTER SYSTEM

The present patent application is a continuing application of the co-pending patent application entitled "System And Method For Virtual Device Access In A Computer System," filed on Jul. 26, 1996, and assigned Ser. No. 08/690,424 now abandoned.

FIELD OF THE INVENTION

The present invention generally relates to controlling and managing access to graphics hardware on a computer system and, more particularly, to a system and method for virtual access of graphics hardware on a computer system with no per-transaction performance cost.

BACKGROUND OF THE INVENTION

A graphics hardware device is commonly used in a computer system to render two or three-dimensional representations of an object on a two-dimensional screen of a display device. Typically, an object to be rendered on the display screen is divided into a plurality of graphics primitives. The graphics primitives are basic components of a graphics picture and may be defined by the geometries of a point, line, vector, or polygon, such as a triangle. In order to render the primitives of an object, the primitives are fed through a graphics pipeline where various types of processing occurs, for example, transformation, lighting for shading, clipping, perspective division, and scan conversion. The operations of a graphics pipeline are typically performed by the graphics hardware which receives the primitive data from an application that is running on the computer system.

In the competitive market place of computer software, the time it takes for an application to render an object on a display device is a primary concern. The amount of time required is to a large degree driven by the amount of time each application interface ("API") call takes to execute. For instance, the graphics accelerators which perform their own geometry processing require that the graphics API send the application's image data directly to the graphics hardware. Further, in order to prevent multiple graphics processes from interfering with each other, a given graphics API entry point must ensure its graphics context is currently loaded in the hardware before it can initiate rendering. This checking substantially increases the overhead of the graphics API call. In high performance systems, dedicated graphics accelerators process the graphics data. Therefore, in order to achieve maximum performance, the graphics APIs must deliver the data to the graphics hardware with a minimum amount of overhead. Thus, the overhead associated with negotiating control over the graphics hardware can effectively remove the speed advantages of the graphics accelerator.

Of particular relevance are vertex based APIs wherein each component of a primitive (color, normal, texture coordinate or vertex) is specified with a separate library call, each of which requires a hardware access. Therefore, with vertex based APIs, the time required to lock (i.e., provide exclusive access) and unlock the graphics hardware amounts to a much larger percentage of the work being performed in rendering the primitive than is the case with primitive based APIs where only one library call is made per primitive. Thus, the overhead associated with locking and unlocking the graphics hardware for each component of a primitive significantly decreases the performance of vertex based APIs.

Once the API of an application has been given access to the graphics hardware, the API begins to transmit its data to the graphic hardware. The time required by the graphics hardware to process data can vary by several orders of magnitude depending upon the data and the processes being performed by the graphics accelerator. Therefore, it is possible that the data buffers of the graphics hardware may become full and that data may be lost because the graphics hardware is unable to accept further input data. Consequently, a certain amount of overhead in the graphics API is attributed to managing data flow to check that the data buffers of the graphics hardware have enough space for data that is going to be sent to the graphics hardware by an application.

Accordingly, a need exists in the industry for a system and method for accessing the graphics hardware of a computer system with no per-transaction cost. This is a particular need with regard to vertex based APIs where each library call results in a hardware access. Furthermore, it would be desirable to be able to control the flow of data from the graphics API to the graphics hardware with no device specific kernel support from the operating system, and with a minimum amount of overhead in the API so that data is not lost because the graphics hardware device is able to process the data fast enough.

SUMMARY OF THE INVENTION

The present invention overcomes the inadequacies and deficiencies of the prior art as discussed hereinbefore and is well known in the industry. The present invention provides for virtual access of the graphics hardware in a computer system by one or more applications running asynchronously on the computer system. Thus, the applications can access the graphics hardware device as if they had exclusive access, with no explicit checking or protocol in the graphics application program interface (API).

In accordance with the present invention, access of the graphics hardware device is divided into device independent control that resides in the operating system and device dependent control that resides in the graphics API of each of the applications operating on the computer system. The device independent control is performed by a hardware control manager that is provided in the operating system, and that essentially controls who has access to the graphics hardware and when. The device dependent control is performed by a signal handler that is provided in the graphics API of each application, and that essentially controls the switching of access to the graphics hardware between applications. In addition, provided is a shared memory space that is accessible by each of the applications and configured for storing the identity of the application that is currently accessing the graphics hardware and the graphics hardware state of each application.

The hardware control manager includes control logic that will allow each application to access the graphics hardware upon request, but only after the graphics context state of that application has been loaded in the graphics hardware. The hardware control manager utilizes access protection identifiers for detecting when an application desires to access the graphics hardware. When a protection identifier fault is detected, the hardware control manager sends a signal to the application attempting access. The signal initiates a user level signal handle that must save the existing graphics state and restore the graphics state for this application. Once the application's graphics hardware state has been loaded into the graphics hardware, that application is given permission by the hardware control manager to access the graphics hardware. Thus, once the fault has been resolved, the application is able to access the graphics hardware device with zero overhead, as if it were the only application talking to the graphics hardware.

The signal handlers are implemented at user level as a part of the graphics API library of each application, and therefore are capable of efficiently handling device dependent control, such as graphics context switching. In the preferred embodiment, the signal handler of the application seeking access to the graphics hardware is responsible for performing graphics context switches. This comprises saving the graphics hardware state associated with the application currently accessing the graphics hardware, and restoring the graphics hardware state of the application seeking access to the graphics hardware. Accordingly, the switching of the graphics hardware state in the graphics hardware between applications is done behind the scenes so that the applications do not recognizes that another application is either taking over access of the graphics hardware or is acquiring access of the graphics hardware from another application. Thus, each application is provided with virtual device access.

The present invention also provides for and can be conceptualized as a method for virtual access to the graphics hardware of a computer system as follows. Initially, an application running on a computer system attempts to access the graphics hardware. This causes a protection identifier fault that is recognized by the hardware control manager as an attempt to use the graphics hardware. In addition, the application process becomes blocked as the hardware control manager processes the fault. However, from the perspective of the application, the application has merely made an ordinary graphic access the perception that it is the only application that has access to the graphics hardware. If the graphics hardware is available, then the hardware control manager will award the application access to the graphics hardware immediately. Otherwise, the application remains blocked and the hardware control manager must wait until the application currently accessing the graphics hardware can be interrupted.

If, however, the current application can be interrupted, then the hardware control manager sends a control signal to the signal handler of the application attempting access instructing the signal handler to perform a graphics context switch. As mentioned above, a graphics context switch includes saving, in the shared memory, the graphics hardware state of the application that is currently accessing the graphics hardware device, and restoring the graphics hardware state of the application seeking to access the graphics hardware device. When the signal handler has completed the graphics context switch, the signal handler notifies the hardware control manager. This process is finished when the hardware control manager grants the application access to the device.

Any subsequent attempt by an application to access the graphics hardware is handled in substantially the same manner as described above. Though it is noted that each application that is given permission to access the graphics hardware device is allowed at least a minimum graphics time-slice to prevent unacceptable thrashing between competing applications running in parallel.

In addition, as described above in the Background section, there are times when the graphics hardware is unable to accept more data. In these cases, the flow of graphics data must be stemmed, but in a way that incurs little or no overhead to the graphics API library of the application. Accordingly, the present invention provides for a flow control mechanism to achieve this goal by first slowing the flow of data when the input data buffers of the graphics hardware reach a first predetermined point, and if necessary, stopping the flow of data when the input data buffers reach a second predetermined point.

The flow control mechanism essentially slows down the data flow when it first detects that the graphics hardware is falling behind. A low water mark in the hardware's input data buffer triggers the interface control logic to start responding to bus transactions more slowly. These delays will eventually promulgate back to the processor that is writing the data, effectively throttling the data without extra overhead in the graphics API.

If the slower data rate is still too fast for the graphics hardware to keep up, and the input data buffer continues to fill, a high water mark in the input data buffers triggers a directed interrupt that will be sent directly to the processor that is writing the data. The operating system will catch the interrupt and recognize that the graphics hardware is backed-up, and remove permission to access the graphics hardware from any application. It is critical in a multiprocessing system that the interrupt is directed to the correct processor in order to minimize the latency from the time the need to shutdown is detected to when the data flow is actually stopped. Thus, the operating system needs to keep the graphics hardware device up-to-date with regards as to which processor is currently sending data.

When the hardware input buffers empty far enough, a restart mark triggers another interrupt that is sent to the processor. When this interrupt is received by the operating system, it effectively re-opens the graphics hardware for data traffic. The top priority graphics process that was blocked is awakened and awarded access to the graphics hardware device.

By utilizing the combination of slowdown and shutdown in the data flow to the graphics hardware device, optimum performance is achieved.

An advantage of the system and method of virtual device access in accordance with the present invention is they place the device dependent control in user level code rather than with the operating system. This increases the flexibility of the graphics software libraries.

An advantage of the system and method of virtual device access in accordance with the present invention is they make provisions for the control of data flow without any associated overhead in the graphics API.

An advantage of the system and method of virtual device access in accordance with the present invention is they eliminate contention between applications seeking to access the graphics hardware device.

An advantage of the system and method of virtual device access in accordance with the present invention is they provides for zero overhead access to the graphics device.

Other features and advantages of the present invention will become apparent to one with skill in the art upon examination of the following drawing and detailed description. It is intended that all such additional features and advantages be included herein within the scope of the present invention, as defined by the claims.

BRIEF DESCRIPTION OF THE DRAWINGS

The present invention can be better understood with reference to the following drawings. The elements of the drawings are not necessarily to scale, emphasis instead being placed upon clearly illustrating principles of the present invention. Furthermore, like referenced numerals designate corresponding parts throughout the several views.

DETAILED DESCRIPTION OF THE PREFERRED EMBODIMENT

I. Introduction

The present invention provides for a system and method for virtual device access in a computer system that enables the graphics application program interface (API) library to access a graphics hardware device with no per-transaction performance cost. This is particularly useful with vertex based APIs because of the overhead associated with locking and unlocking the graphics hardware device with each library call. Moreover, with the virtual device access of the present invention, no device specific kernel support is required from the operating system. Instead, device specific support is provided at the user level by a signal handler associated with each application. This allows greater flexibility, easier development and maintenance, and simpler product delivery. Another important aspect of the virtual device access of the present invention is the automatic control over the flow of data. The present invention incorporates a novel approach for controlling data flow from the graphics API to the graphics hardware, whereby the data flow is automatically slowed down or stopped with essentially no associated overhead in the graphics API.

II. Architecture

A. Device Access

Figure 1:
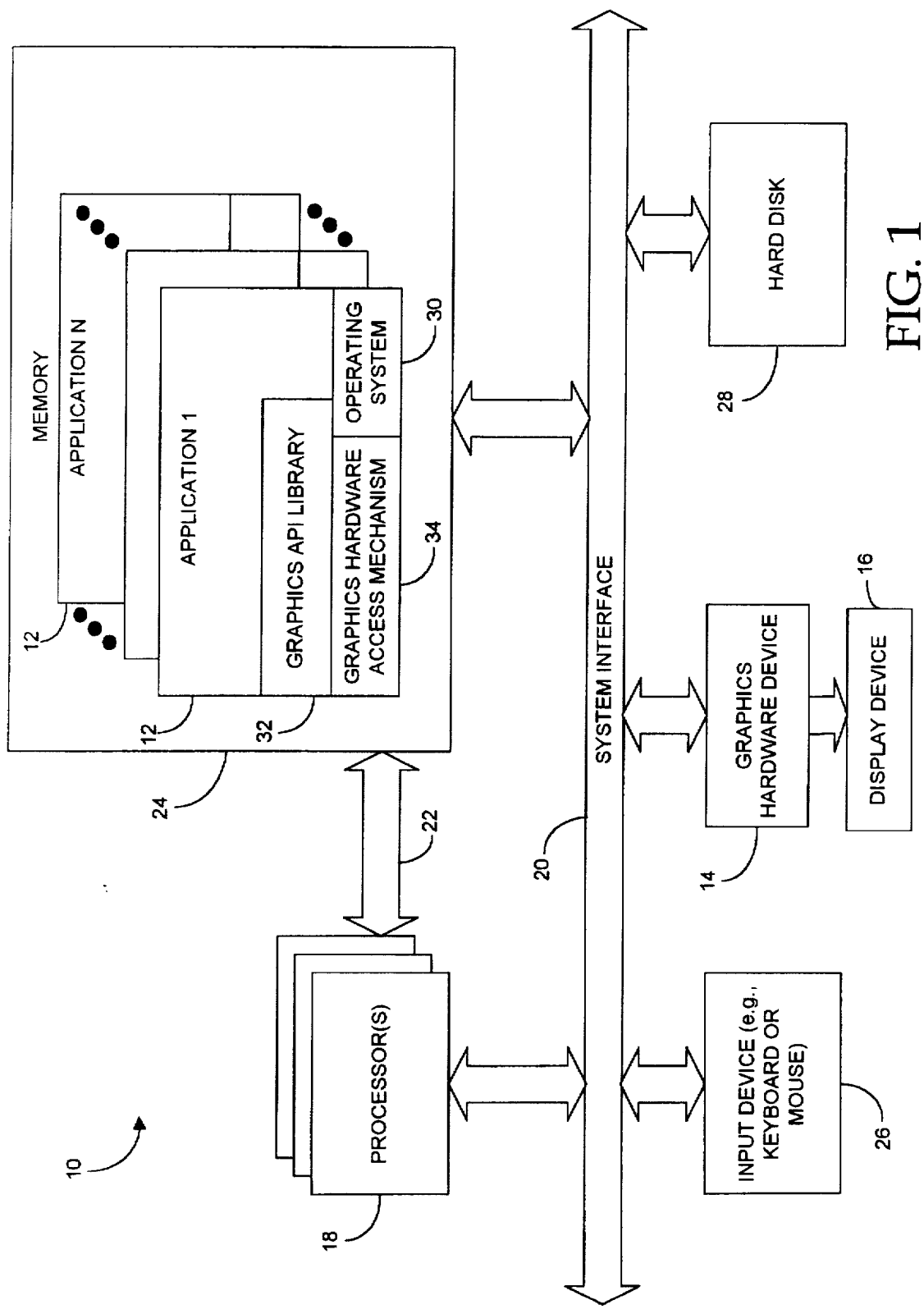
FIG. 1 is a block diagram of a computer system suitable for implementing the present invention.

With reference now to the drawings, illustrated in FIG. 1 is a computer system 10 suitable for implementing the virtual device access system and method of the present invention that is capable of enabling one or more applications 12 to access a graphics hardware device 14 in an asynchronous fashion for rendering images on a display device 16.

The computer system 10 comprises one or more conventional processors 18, each of which is preferably capable of multitasking, each of which communicates to other elements within a computer system 10 via a system interface 20. In addition, a memory bus 22 is provided to interconnect the processor(s) 18 and a memory 24 in order to increase the speed of transfer between the memory 24 and the processor(s) 18. An input device 26, for example, a keyboard or mouse, is used to input data from a user of the computer system 10. The graphics hardware device 14 typically comprises a graphics accelerator board and frame buffer for processing image data that is displayed on the display device 16. The graphics accelerator of the graphics hardware device 14 is preferably configured as a graphics pipeline for performing one or more of the following: transformation, lighting or shading, clipping, perspective division, and scan conversion. Lastly, a hard disk 28 is provided to increase the memory capacity of the computer system 10.

In the memory 24, one or more of the applications 12 can be executed at a time via a conventional operating system 30. In order to communicate with the graphics hardware device 14, each application is linked to a graphics API library 32 so that each application 12 has its own graphics API library 32 in its virtual address space for interfacing with the graphics hardware device 14. The graphics API library 32 essentially comprises device drivers called by the application for performing particular functionality on the graphics hardware device 14. Particularly, the graphics API library 32 translates the API calls into graphics hardware accesses.

A graphics hardware access mechanism 34 provides the means by which the graphics API library 32 accesses the graphics hardware device 14. The graphics hardware access mechanism 34 resides in the applications' 12 virtual memory space and is direct memory mapped to the graphics hardware device 14 in order to provide direct connectivity between the graphics API library and the graphics hardware device 14.

Figure 2:
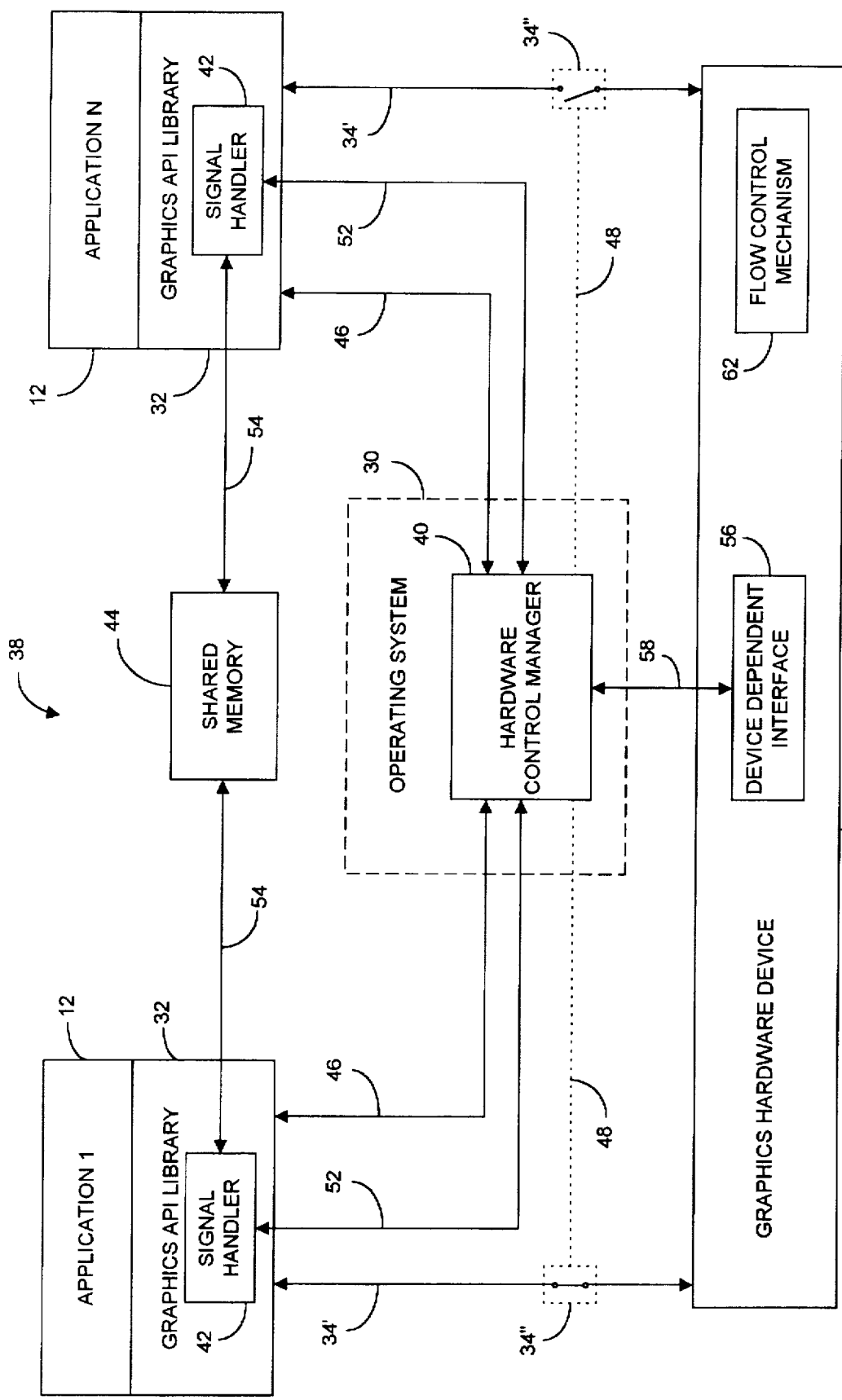
FIG. 2 is a block diagram of the architecture and functionality of the components of a virtual device access system suitable for operation on the computer system of FIG. 1.

With reference to FIG. 2, the architecture and functionality of the virtual device access system and method of the present invention are illustrated. A virtual device access system 38 in accordance with the present invention comprises a hardware control manager 40 configured within the operating system 30, a signal handler 42 configured within the virtual memory space of the graphics API library 32 of each application 12, and a shared memory 44.

The hardware control manager 40 is implemented as a device driver in the operating system 30 and includes control logic that manages which application 12 has access to the graphics hardware device 14 and when access is to switch from one application 12 to another application 12. In the preferred embodiment, the hardware control manager 40 provides device independent control that is designed to give access to any application 12 attempting access to the graphics hardware device 14 unless an application that is currently accessing the graphics hardware device 14 is in a critical section. For purposes of the present disclosure, a critical section is a point in the processing of data when the graphics hardware device 14 should not be interrupted, as is appreciated by those of skill in the art. By removing any need for device specific support in the operating system 30 for implementing the virtual device access system 38 of the present invention, the operating system 30 does not have to be dynamically loaded with device specific code.

The hardware control manager 40 controls access to the graphics hardware device 14 via the graphics hardware access mechanism 34 (FIG. 1) of each application 12. The graphics hardware access mechanism 34 of each application 12 is represented in FIG. 2 as a combination of a connection 34' and a switch 34" directly connecting the respective graphics APIs 32 and the graphics hardware device 14. The switches 34" are controlled by the hardware control manager 40 via command links 48 and are provided to enabled or disabled the connections 34' in accordance with the methodology of the present invention as described below. Accordingly, over the graphics hardware access mechanism 34, the graphics APIs have direct access to the graphics hardware device 14 for transferring data such as color, texture, perspective, etc., and for transferring graphics hardware state information.

The graphics hardware access mechanism 34 (i.e., elements 34' and 34" in FIG. 2) of each application is protected by protection identifiers (PID), as well known in the industry as associated with virtual memory addresses. The PIDs associated with the graphics hardware access mechanisms 34 are configured to generate a protection fault each time an application 12 attempts access to the graphics hardware device 14 when it is not currently allowed access. In essence, switch 34" can be thought of as the protection identifier hardware. The switch 34" either lets the access through or generates a fault to the hardware control block 40. The fault is communicated via the connection 48, while connections 46 is used for setup and/or other management communications between the graphics API library 32 and the hardware control manager 40.

The signal handler 42 of each application 12 provides the hardware device dependant control associated with a hardware access. The signal handler 42 performs the functionality of saving the graphics hardware state of the application 12 that is currently accessing the graphics hardware device 14, and restoring the graphics hardware state of the application 12 that is attempting to access the graphics hardware device 14. This process is referred to as graphics context switching. As an important feature of the present invention, graphics context switching is performed by the signal handler in a manner that is transparent to either application 12 so as not to incur any overhead in the graphics API library 32 and so that access contention is transparent to each application 12.

The signal handler 42 communicates with the hardware control manager 40 over a connection 52. The connection 52 is utilized to transfer command signals between the signal handler 42 and the hardware control manager 40 for such task as initiating a graphics context switch or to notify the completion of a graphics context switch. In addition, the signal handler 42 checks for changes to the window geometry state and updates the hardware graphics state as appropriate.

The shared memory 44 provides a common memory location that each application 12 can access. The shared memory 44 can be accessed by each application via respective connections 54 for saving and retrieving the graphics hardware states of the applications for use in a graphics context switch. In addition, the shared memory includes a global, shared object referred to as the graphics context pointer (not shown) that indicates which application is currently accessing the graphics hardware device 14. This information in the graphics context pointer is utilized by the signal handler 42 that is performing a graphics context switch so that the signal handler can read the graphics hardware state of the application currently accessing the graphics hardware device 14 and then store that state information in a memory location, within the shared memory 44, that is associated with the current application 12. Thus, that application will know where its state information resides within the shared memory 44 when it regains access to the graphics hardware device 14. It should be noted that the graphics hardware states are both written to and read from the graphics hardware device 14 over the graphics hardware access mechanism 34 associated with the application 12 attempting to access the graphics hardware.

In addition, the hardware control manager 40 is able to perform simple operations with regard to the graphics hardware device 14 via a device dependent interface 56. The device dependent interface 56 is configure as a part of the graphics hardware device 14 and is connected to the hardware control manager 40 via connection 58. The device dependent interface 56 comprises a device dependent read only memory (ROM) having a kernel-to-hardware interface. Accordingly, code provided in the ROM is used to interpret the control signals from the hardware control manager 40 so that they can be executed by graphics hardware device 14. Samples of such operations performed via the device dependent interface 56 are simple terminal operations (i.e., draw a character or scroll screen), in addition to interrupt control and device status functions.

B. Flow Control

With reference to FIG. 2, a flow control mechanism 62 is provided as a part of the graphics hardware device 14 for automatically slowing down or stopping the flow of data to the graphics hardware device 14 without incurring overhead in the graphics API. Because the time required for the graphics hardware device 14 to process the image data for a particular application 12 may vary by several orders of magnitude depending upon the data and the processing being performed to that data, it is possible that the input data buffers (not shown) of the graphics hardware device 14 may become too full to accept further input data. As discussed in the Background section, prior solutions to this problem required substantial overhead and/or resulted in the loss of data. However, the control flow mechanism 62 of the present invention monitors a low water mark in the input buffers of the graphics hardware device 14 and when the input data buffers reach the low water mark, this control flow mechanism 61 triggers the interface control logic of the graphics device 14 to start responding to the transactions over the graphics hardware access mechanism 34 more slowly. These delays eventually result in the processor 18 writing data at a lower rate, effectively throttling the data transmission rate without incurring extra overhead in the graphics API library 32.

If, however, the input data buffer continues to fill to the point where it reaches a high water mark, the flow control mechanism 62 sends a second control signal directly to the processor 18 that is writing the data in order to interrupt the data flow. The operating system 30 detects this interrupt and recognizes it as indicating that the graphics hardware input buffers are backed up, and will consequently remove permission for any application from accessing the graphics hardware device 14. It should be noted that in order for the second signal to be sent to the appropriate processor 18 in a multiprocessor environment, the flow control mechanism 62 must track which processor 18 is currently writing data to the graphics hardware device 14.

III. Operation

The present invention also provides for and can be conceptualized as a method for virtual device access whereby an application 12 operating on a computer system 10 can access the graphics hardware device 14 with no per-transaction performance cost. As previously discussed, an important feature of this methodology is that it does not require device specific support from the operating system 30. The device specific support provided by the signal handler 42 associated with the API library 12. It will be assumed for purposes of disclosing the preferred embodiment that the control logic provided by the hardware control manager 40 is such that the hardware control manager 40 will grant hardware access to any application attempting access for at least a minimum graphics time-slice, unless the application that is currently accessing the graphics hardware device is in a critical section. As can be appreciated by one of ordinary skill in the art, there are times when access to the graphics hardware device 14 should not be interrupted and that these times are particularly protected as critical sections, as described above.

Figure 3A:
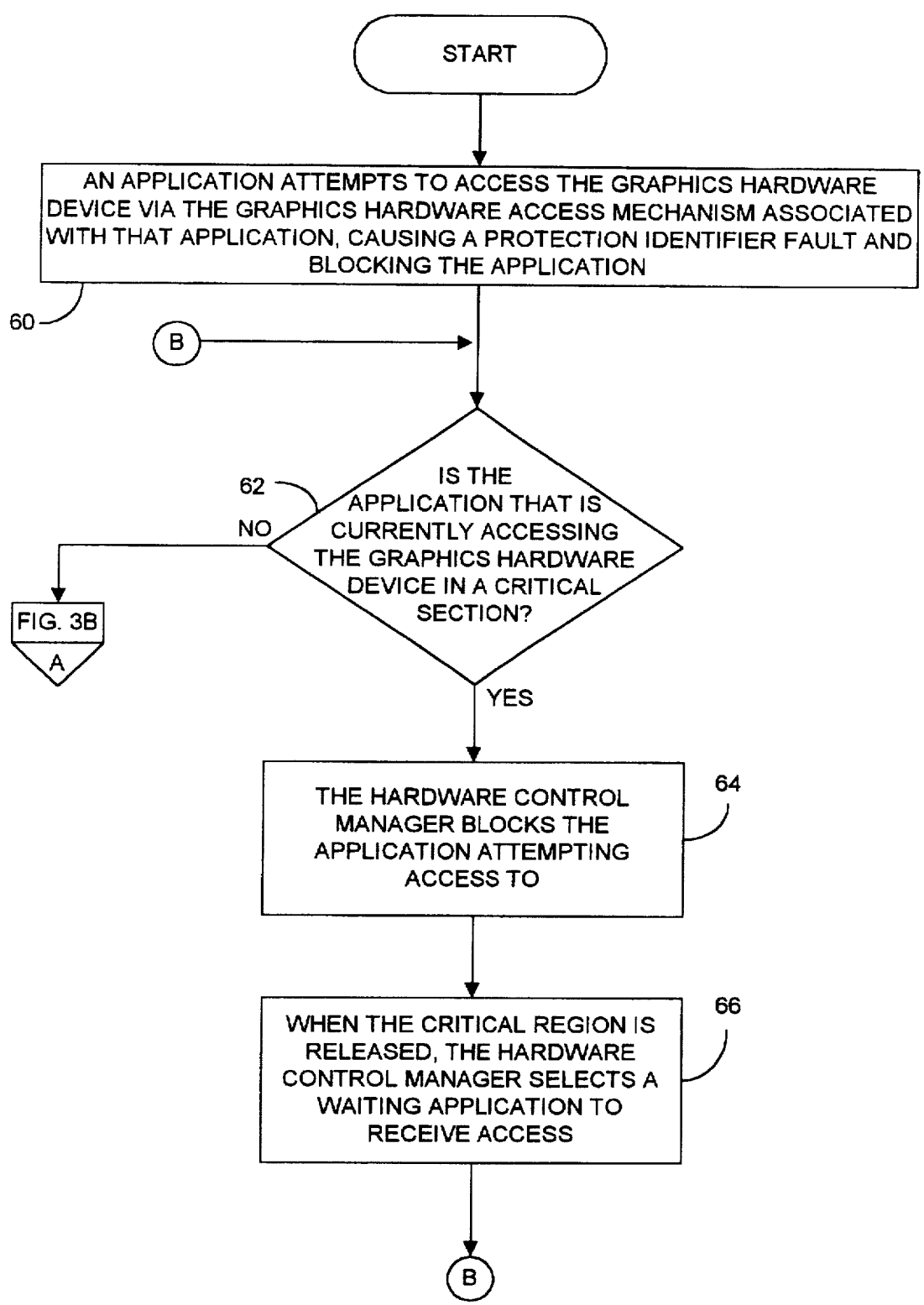
FIGS. 3A and 3B are flowcharts illustrating a methodology of the virtual device access of the present invention.
Figure 3B:
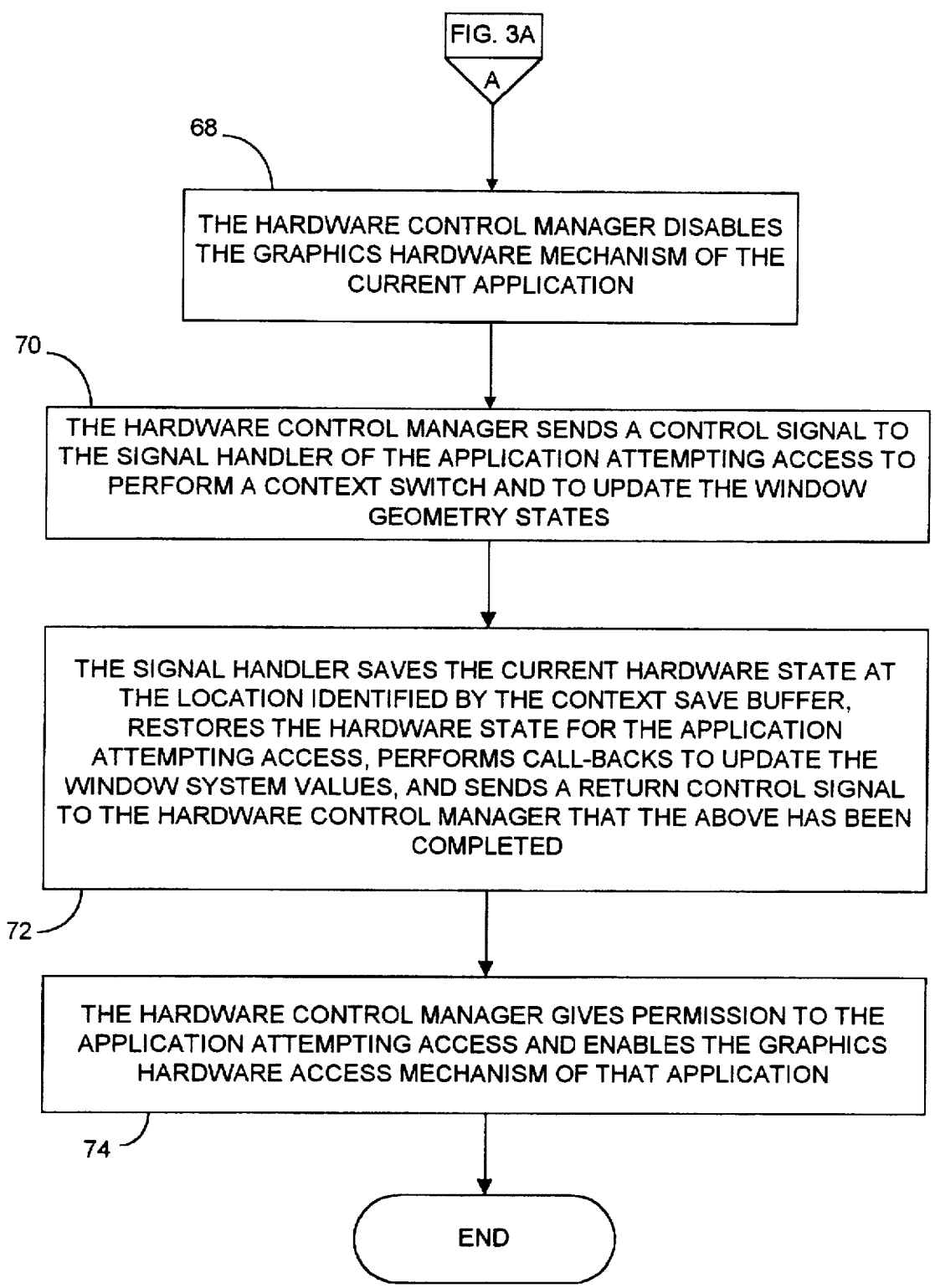

With reference now to FIGS. 3A and 3B, illustrated is an example of virtual device access in accordance with the methodology of the present invention, whereby an application 12 attempts to access the graphics hardware device 14. Initially, at block 60, an application 12 attempts to access the graphics hardware device 14 via the graphics hardware access mechanism 34 associated with that application 12. As discussed above, a protection identifier (PID) fault associated with each graphics hardware access mechanism 34 is generated when an application tries to access the graphics hardware device 14. Accordingly, when the application 12 attempts to access the graphics hardware device 14, a PID fault is generated and the application becomes blocked, that is, the application's process cannot continue execution until the fault is resolved.

The hardware control manager 40 recognizes the PID fault as an application attempting to access the graphics hardware device 14. In response, the hardware control manager 40 makes a determination of whether the application currently accessing the graphics hardware device 14 is in a critical section, as indicated by decision block 62. If the application that is currently accessing the graphics hardware device 14 is in a critical section, the hardware control manager 40 blocks the application process waiting for the critical section to be released as indicated at block 64. Next, at block 66, once the critical section has been released, the hardware control manager 40 selects a waiting application to receive access to the graphics hardware device 14. From block 66, the process described hereinabove begins again at block 62 with the hardware control manager 40 checking to see if the current application is in a critical section.

However, if that decision block 62, the hardware control manager 40 determines that the application 12 that is currently accessing the graphics hardware device 14 is not in a critical section, then the hardware control manager 40 disables the graphics hardware access mechanism 34 of the application that was previously accessing the graphics hardware device 14, as indicated by block 68 of FIG. 3B. Next, the hardware control manager 40 sends a control signal to the signal handler 42 of the application 12 attempting access instructing that signal handler 42 to perform both a graphics context switch and an update of the window geometry states, as indicated by block 70.

At block 72, the signal handler 42 of the application 12 attempting access performs a graphics context switch. This comprises the signal handler 42 saving the hardware state of the graphics hardware device 14 for the application that is currently accessing the graphics hardware device 14 so that the application can restart the processing of graphics data at the place where it was stopped so that it could relinquish access to the application 12 attempting to gain access. As mentioned above, a graphics context switch can only occur when the application currently accessing the graphics hardware device 14 is not in a critical section, as determined at block 66. The step of saving the hardware state includes reading the hardware state from the graphics hardware device 14 via the graphics hardware access mechanism 34 of the requesting application 12 and storing that information in the shared memory 44. The signal handler 42 must place that information in a particular location with a shared memory 44 associated with the application that was previously accessing the graphics hardware device 14 so that application knows where its hardware state information resides when it attempts to regain access to the graphics hardware device 14. This location is provided by the graphics context pointer in the shared memory 44 which indicates which application's graphics context is currently loaded in the graphics hardware device 14, and thus, indicates where to save the hardware state information when another application attempting access to the graphics hardware device 14 performs a graphics context switch. In the preferred embodiment, the reading of the hardware state from the graphics hardware device 14 is preferably executed by a direct memory access (DMA), though it would recognize that there are numerous other suitable methods such as through a direct hardware read.

The second part of graphics context switch is restoring the hardware state of the application 12 attempting access to the graphics hardware device 14. The hardware state of the application 12 attempting access is retrieved by the signal handler 42 from the shared memory 44 and is written to the graphics hardware device 14 via the graphics hardware access mechanism 34. Preferably, as in the save step of graphics context switching, the restore step is performed with a DMA, though it is recognized that other methods may be equally suitable. In addition, the signal handler 42 updates window geometry state in the hardware if necessary. At block 72, the signal handler 42 of the application attempting access sends a return control signal to the hardware control manager 40 that the graphics context switch has been performed and the window system values updated, if applicable.

In response to the return control signal, the hardware control manager 40 gives permission to the application 12 attempting access to access the graphics hardware device 14 and enables the graphics hardware access mechanism 34 of the requesting application as indicated at block 74. As illustrated in FIG. 2, this is represented by closing switch 34" via link 48.

In order to increase the efficiency achieved by the virtual device access, the present invention also provides automatic flow control of data from the graphics API 32 to the graphics hardware device 14. Particularly, the flow control scheme of the present invention prevents the application from having to check the status of the input data buffers of the graphics hardware device 14 on a continual basis in order to determine whether the data buffers are able to receive more data, which can be appreciated as a costly but necessary task in the prior art schemes.

In accordance with the flow control scheme of the present invention as implemented by the flow control mechanism 62, the application will automatically be stalled when the graphics hardware device 14 is unable to process the data fast enough to keep up with the application, without taking the risk of losing data. In general, a flow control mechanism 62 monitors a low water mark indicator provided by the graphics hardware device 14 for detecting when the data in the input data buffers reach a first predetermined level. Further, a high water mark is also monitored by the flow control mechanism 62 for detecting when the data in the input data buffer reaches a second predetermined level.

In essence, when the input data buffers of the graphics hardware device 14 become filled to the low water mark, the flow control mechanism 62 automatically starts responding to the bus transactions more slowly. The effect of this first control signal eventually propagates back to the processor 18 that is writing the data to the graphics hardware device 14, thereby essentially throttling the data rate without adding to the overhead in the graphics API 32 library or generating extraneous interrupts to the processor.

If the data rate is still too fast for the graphics hardware device 14, and the data in the input data buffer reaches the high water mark, a directed interrupt, or second control signal, is sent to the processor 18 that is writing the data to inform the processor 18 of this fact. As a result, the processor 18 is prevented from sending any more data to the graphics hardware device 14. Eventually, the data in the input data buffer will drop below the low water mark and the flow control mechanism will send a restart signal to the processor 18 indicating that the application 12 can resume sending data to the graphics hardware device 14.

In order to implement this feature of the present invention in a multiprocessor environment, the graphics hardware device 14 must know which processor 18 is currently sending it data. Without this information, the high water mark interrupt must interrupt all processors 18 to be sure that the data is stopped in a timely manner. If the processor 18 that is sending data is not stopped before the capacity of the input data buffers is exceeded, then data will be lost, which is unacceptable. As would be apparent to one of skill in the art, this can be achieved via a process scheduler in the operating system that is responsible for updating the flow control mechanism 62 with the correct processor 18 identification as the graphics applications are executed.

In concluding the detailed description, it should be noted that it will be obvious to those skilled in the art that many variations and modifications may be made to the preferred embodiment without substantially departing from the principles of the present invention. All such variations and modifications are intended to be included herein within the scope of the present invention, as set forth in the following claims. Further, in the claims hereafter, the corresponding structures, materials, acts, and equivalents of all means or step plus function elements are intended to include any structure, material, or acts for performing the functions with other claimed elements as specifically claimed.

Wherefore, the following is claimed:

1. A virtual device access system for providing zero overhead locking of a graphics hardware device of a computer system to applications running on the computer system, comprising:
   a hardware control manager for detecting when one of said applications attempts to access said graphics hardware device and for enabling and disabling access to said graphics hardware device;
   a user-level signal handler associated with each of said applications, each of said user-level signal handlers configured for performing a graphics context switch wherein when one of said applications attempts to access said graphics hardware device, said hardware control manager signals the user-level signal handler associated with the application attempting to access said graphics hardware device, wherein the user-level signal handler signaled by the hardware control manager performs a graphics context switch in response to being signaled by the hardware control manager; and
   a shared memory resource that is accessible by each of said applications and configured for storing an identity of said application that is currently accessing said graphics hardware device for use by each of said user-level signal handlers when performing said graphics context switch.

2. The system of claim 1, comprising a graphics hardware access mechanism associated with each of said applications and direct mapped to said graphics hardware device for handling direct communications between respective said applications and said graphics hardware device.

3. The system of claim 1, wherein one of said applications includes a graphics application interface library for communicating with said graphics hardware device.

4. The system of claim 1, wherein said hardware control manager provides control logic for managing contention and access to said graphics hardware device by said applications.

5. The system of claim 1, wherein said graphics context switch performed by said signal handlers includes saving in said shared memory resource a first graphics hardware state of a first application that is currently accessing said graphics hardware device, and restoring to said graphics hardware device a second graphics hardware state of a second applications attempting to access said graphics hardware device.

6. A system of claim 1, further comprising a flow control mechanism for managing flow of data from said applications to said graphics hardware device.

7. The system of claim 2, wherein said hardware control manager enables and disables said graphics hardware access mechanisms associated with each of said application.

8. The system of claim 2, wherein each of said graphics hardware access mechanisms includes a protection identifier for signaling said hardware control manager when a respective one of said applications is attempting to access said graphics hardware device and for identifying which said application is attempting to access said graphics hardware device.

9. The system of claim 6, wherein said flow control mechanism includes detection means for reducing a data flow rate to said graphics hardware device when an input data buffer of said graphics hardware device is filled above a first predetermined level, and for sending a second control signal to said hardware control manager to stop data flowing to said graphics hardware device when said input data buffer is filled above a second predetermined level.

10. The system of claim 7, wherein said control logic of said hardware control manager allows each said application that accesses said graphics hardware device a minimum amount of processing time.

11. A method for virtual device access that provides zero overhead locking of a graphics hardware device of a computer system to applications running on the computer system, comprising the steps of:
   detecting when a first application attempts to access the graphics hardware device;
   determining if a second application is currently accessing said graphics hardware in a critical section;
   if said second application is in said critical section, a hardware control manager blocks said first application until said critical section is released; and
   if said second application is not in said critical section, then performing the following steps:
       performing a graphics context switch between said first and second applications, the graphics context switch being performed by a user-level signal handler; and
       giving permission to said first application to access said graphics hardware device.

12. The method of claim 11, further comprising the step signaling a signal handler associated with said first application to perform a graphics context switch if said second application is not in said critical section.

13. The method of claim 11, wherein the step of performing a context switch comprises the steps of:
   saving a first graphics hardware state of said second application in a shared memory; and
   restoring a second graphics hardware state of said first application in said graphics hardware device.

14. The method of claim 11, further including the step of disabling access of said second application to said graphics hardware device if said second application is not in said critical section.

15. The method of claim 11, wherein said application have direct access to said graphics hardware device via a graphics hardware access mechanism.

16. The method of claim 11, wherein the step of performing said graphics context switch includes updating window system values.

17. The method of claim 11, further including the step of controlling data flow to said graphics hardware device.

18. A computer program for providing virtual device access of a graphics hardware device of a computer system by applications running on the computer system, said computer program comprising:

control means for operating in an operating system of said computer system and configured for detecting when one of said applications attempts to access said graphics hardware device and for enabling and disabling access to said graphics hardware device;

user-level context switching means for operating as a part of each said application and configured as device dependent code that performs graphics context switching when signaled by said control means; and memory means for storing an identity of said application that is currently accessing said graphics hardware device and configured so as to be accessible by each of said applications.

19. A virtual device access system for providing zero overhead locking of a graphics hardware device of a computer system to applications running on the computer system, comprising:

a hardware control manager for detecting when one of said applications attempts to access said graphics hardware device and for enabling and disabling access to said graphics hardware device;

a signal handler associated with each of said applications, each of said signal handlers configured for performing a graphics context switch wherein when one of said applications attempts to access said graphics hardware device, said hardware control manager signals the signal handler associated with the application attempting to access said graphics hardware device, wherein the signal handler signaled by the hardware control manager performs a graphics context switch in response to being signaled by the hardware control manager;

a shared memory resource that is accessible by each of said applications and configured for storing an identity of said application that is currently accessing said graphics hardware device for use by each of said signal handlers when performing said graphics context switch; and a flow control mechanism for managing flow of data from said applications to said graphics hardware device, the flow control mechanism including detection means for reducing a data flow rate to said graphics hardware device when an input data buffer of said graphics hardware device is filled above a first predetermined level, and for sending a second control signal to said hardware control manager to stop data flowing to said graphics hardware device when said input data buffer is filled above a second predetermined level.

* * * * *